(12) United States Patent
Salinas et al.

(10) Patent No.: US 9,106,423 B1
(45) Date of Patent: Aug. 11, 2015

(54) USING POSITIONAL ANALYSIS TO IDENTIFY LOGIN CREDENTIALS ON A WEB PAGE

(75) Inventors: Govinda S. Salinas, Austin, TX (US); Abhay Sudhakar Kulkarni, Playa del Rey, CA (US); Anne Kang-Ping Yeh, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 1037 days.

(21) Appl. No.: 12/405,065

(22) Filed: Mar. 16, 2009

(51) Int. Cl.
| | |
|---|---|
| G06F 7/04 | (2006.01) |
| G06F 15/16 | (2006.01) |
| G06F 17/30 | (2006.01) |
| H04L 29/06 | (2006.01) |
| H04L 9/32 | (2006.01) |
| G06F 21/00 | (2013.01) |
| H04L 29/08 | (2006.01) |
| H04N 1/44 | (2006.01) |

(52) U.S. Cl.
CPC . *H04L 9/32* (2013.01); *G06F 21/00* (2013.01); *H04L 29/0863* (2013.01); *H04N 1/4413* (2013.01)

(58) Field of Classification Search
CPC ... H04L 9/32; H04L 9/3226; H04L 29/06782; H04L 29/0863; H04L 29/06102; H04L 63/083; H04L 67/147; H04L 69/161; H04N 1/4413; H04N 21/4753; G06F 21/00; G06F 3/1246; G06F 17/30896; G06F 21/128; G06F 21/13; G06F 11/3086; G06F 17/22; G06F 17/218; G06F 17/272; G06F 17/2258; G06F 9/30145

USPC .......................................................... 726/6–7
See application file for complete search history.

(56) References Cited

U.S. PATENT DOCUMENTS

| | | | | |
|---|---|---|---|---|
| 5,754,306 | A * | 5/1998 | Taylor et al. ................... | 358/400 |
| 6,171,112 | B1 * | 1/2001 | Clark et al. ................... | 434/322 |
| 6,657,647 | B1 * | 12/2003 | Bright ........................... | 715/856 |
| 6,868,499 | B1 * | 3/2005 | Buckle .............................. | 726/5 |
| 6,981,028 | B1 * | 12/2005 | Rawat et al. ................... | 709/217 |
| 7,725,332 | B1 * | 5/2010 | Soong ............................... | 705/3 |
| 7,970,754 | B1 * | 6/2011 | Jarboe et al. ................... | 707/713 |
| 8,353,039 | B2 * | 1/2013 | Cooley et al. .................... | 726/24 |
| 2003/0191703 | A1 * | 10/2003 | Chen et al. ...................... | 705/36 |
| 2003/0225696 | A1 * | 12/2003 | Niwa .............................. | 705/50 |
| 2003/0233580 | A1 * | 12/2003 | Keeler et al. .................. | 713/201 |
| 2004/0064704 | A1 * | 4/2004 | Rahman ........................ | 713/182 |
| 2004/0080529 | A1 * | 4/2004 | Wojcik .......................... | 345/738 |
| 2004/0119749 | A1 * | 6/2004 | Luque ........................... | 345/771 |
| 2004/0205176 | A1 * | 10/2004 | Ting et al. ...................... | 709/223 |
| 2005/0003801 | A1 * | 1/2005 | Randall et al. ............. | 455/414.1 |
| 2005/0177731 | A1 * | 8/2005 | Torres et al. .................. | 713/182 |

(Continued)

*Primary Examiner* — Azizul Choudhury
*Assistant Examiner* — Tariq Najee-Ullah
(74) *Attorney, Agent, or Firm* — Brill Law Office; Jeffrey Brill (57) ABSTRACT

A login credentials identification component uses analysis of the relative positions of text entry fields to identify login credentials on a web page. The login credentials identification component identifies both a password entry field on a web page, and the text entry field immediately preceding the identified password entry field. The login credentials identification component uses the positional relationship between the identified password entry field and the immediately preceding text entry field, as well as other supplemental factors, to determine that the identified text entry field immediately preceding the password entry field comprises a user name entry field.

17 Claims, 5 Drawing Sheets

(56) References Cited

U.S. PATENT DOCUMENTS

| | | | |
|---|---|---|---|
| 2005/0256841 A1* | 11/2005 | Rawat et al. | 707/1 |
| 2006/0059247 A1* | 3/2006 | Marappan et al. | 709/219 |
| 2006/0174127 A1* | 8/2006 | Kalavade et al. | 713/176 |
| 2008/0010377 A1* | 1/2008 | Nissennboim | 709/226 |
| 2008/0027217 A1* | 1/2008 | Hodge | 536/25.4 |
| 2008/0172381 A1* | 7/2008 | Suh | 707/5 |
| 2008/0320310 A1* | 12/2008 | Florencio et al. | 713/184 |
| 2009/0158399 A1* | 6/2009 | Cooley et al. | 726/4 |

* cited by examiner

USING POSITIONAL ANALYSIS TO IDENTIFY LOGIN CREDENTIALS ON A WEB PAGE

TECHNICAL FIELD

This invention pertains generally to login management utilities, and more specifically to using positional analysis to identify login credentials on a web page.

BACKGROUND

It is useful for login management utilities to be able to identify fields on web pages used for inputting login information, such as user name and password entry fields. Password entry fields can be identified by analyzing the underlying Hypertext Markup Language (HTML) describing a web page. HTML uses a specific type of field to represent a corresponding password entry field on a web page. However, there is no specific field type in HTML to be used for the entry of other types of login information. Some web pages use generic text entry field types for this purpose, whereas some web pages use additional password entry fields to prompt for the input of other login information.

For these reasons, login management utilities typically analyze the text on a web page proximate to given entry fields to attempt to identify login information input fields. For example, if the text "Enter User Name" appears next to a generic text entry field, a login management utility might conclude that the generic text entry field comprises a user name entry field. However, web pages containing login forms are written in many different languages, and use many different terms and criteria to identify their login information entry fields. This makes a proximate text based identification of specific login entry fields difficult and potentially inaccurate.

A text based analysis typically requires maintaining a database of keywords associated with different login entry fields in different languages. Such a database requires entries and updates for every language and all known words/phrases used to prompt a user to enter login information. In practice, no such database can ever be complete or current, and attempting to keep it so is very labor intensive.

It would be desirable to address these issues.

SUMMARY

A login credentials identification component uses analysis of the relative positions of text entry fields to identify login credentials on a web page. The login credentials identification component identifies both a password entry field on a web page, and the text entry field immediately preceding the identified password entry field. The login credentials identification component uses the positional relationship between the identified password entry field and the immediately preceding text entry field, as well as other supplemental factors, to determine that the identified text entry field immediately preceding the password entry field comprises a user name entry field.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
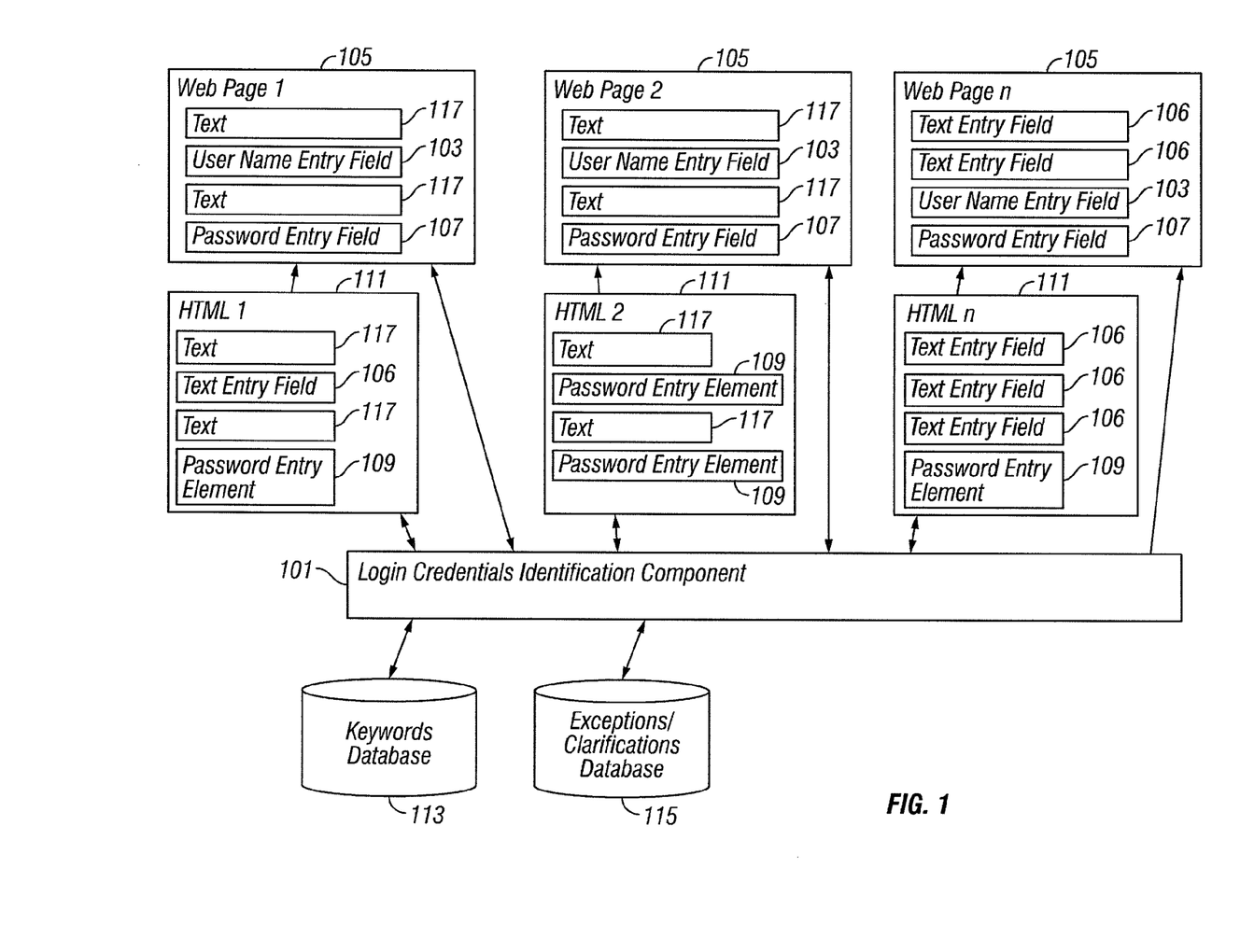
FIG. 1 is a block diagram illustrating a login credentials identification component using positional analysis to identify login credentials on a web page, according to some embodiments of the present invention.

FIG. 1 illustrates a login credentials identification component 101 using positional analysis to identify login credentials on a web page 105, according to some embodiments of the present invention. It is to be understood that although FIG. 1 illustrates the login credentials identification component 101 as a separate entity, the login credentials identification component 101 represents a collection of functionalities which can be implemented as software, hardware, firmware or any combination of these. Where the login credentials identification component 101 is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, the login credentials identification component 101 heuristically identifies a user name entry field 103 on a web page 105 based on the relative position of a password entry field 107. First, the login credentials identification component 101 identifies a password entry field 107 by identifying a specific password entry element 109 in the HTML 111 corresponding to the web page 105. It is to be understood that although this specification discusses web pages 105 described in HTML 111, the scope of the present invention includes any type of interactive login form, described in any type of markup language that uses a specific element to define password entry fields. It is to be further understood that this specification uses the term "user name entry field 103 to refer to a text entry field in which an identifier of the user associated with a given account or service is entered as part of the login process. Although sometimes this identifier is called a user name, in other instances the identifier can be referred to by a different name, or be in the form of the user's email address, account number, social security number, etc.

To identify the user name entry field 103 once the password entry field 107 has been identified, the login credentials identification component 101 leverages the fact that common textual and logical flows dictate that a user name entry field 103 typically immediately precedes the password entry field 107. When looking at almost any web page 105 with login entry fields, it is almost universally true that the user name entry field 103 immediately proceeds the password field 107. In other words, in languages that are read from left-to-right and top-to-bottom, the user name entry field 103 appears directly above and/or to the left of the password entry field 107 on the web page 105 (appropriate directional adjustments can be made for languages read from right-to-left and/or bottom-to-top). Thus, once the password entry field 107 has been identified, the login credentials identification component 101 identifies the text entry field 106 immediately preceding the password entry field 107 as the user name entry field 103. An example of a web page 105 for which the login credentials identification component 101 identifies a user name entry field 103 and a password entry field 107 with such a positional relationship is illustrated in FIG. 1 by Web Page 1.

As noted above, in some instances a password entry field 107 (as opposed to a generic text entry field 106) is used for the user name entry field 103. Where this is the case, the login credentials identification component 101 identifies both password entry fields 107. Responsive to identifying two password entry fields 107 appearing one after the other on a single web page 105, the login credentials, identification component 101 can determine which is the true password entry field 107 and which is the user name entry field 103, based on their relative positions. In other words, the login credentials identification component 101 can identify the password entry field 107 that immediately proceeds the other one as the user name entry field 103, and the second one as the true password entry field 107. An example of a web page 105 for which the login credentials identification component 101 identifies a user name entry field 103 and a password entry field 107 in this manner is illustrated in FIG. 1 by Web Page 2.

Where more than two password entry fields 107 appear on a single web page 105 (or in some embodiments even where only two appear), the login credentials identification component 101 can use key word analysis of adjacent text 117 to supplement the analysis of the relative positions of the fields. For example, if the position of one of the multiple password entry fields 107 does not indicate definitively whether or not it is in fact a user name entry field 103, the login credentials identification component 101 could identify adjacent text 117, and check the identified text 117 against a keyword database 113, looking for words or phrases indicating the nature of the field. Note that this type of supplemental keyword analysis can also be utilized in scenarios in which only a single password entry field 107 appears on a web page 105, in order to identify given entry fields with a greater degree of certainty. Such supplemental keyword analysis involves maintaining a keyword database 113 (or similar keyword storage mechanism), but because the keyword analysis is only used to supplement the positional analysis, the database 113 would not need to be as extensive or require as much upkeep as a more generic keyword database.

In addition to or instead of supplemental keyword analysis, the credentials identification component 101 can also augment the positional analysis by referring to a database 115 of exceptions and/or clarifying information. For example, such information could identify and clarify known instances of text 117 or text entry field 106 combinations that the login credentials identification component 101 would otherwise be likely to misinterpret. This clarification database 115 would also require less maintenance than a generic keyword database.

Figure 2A:
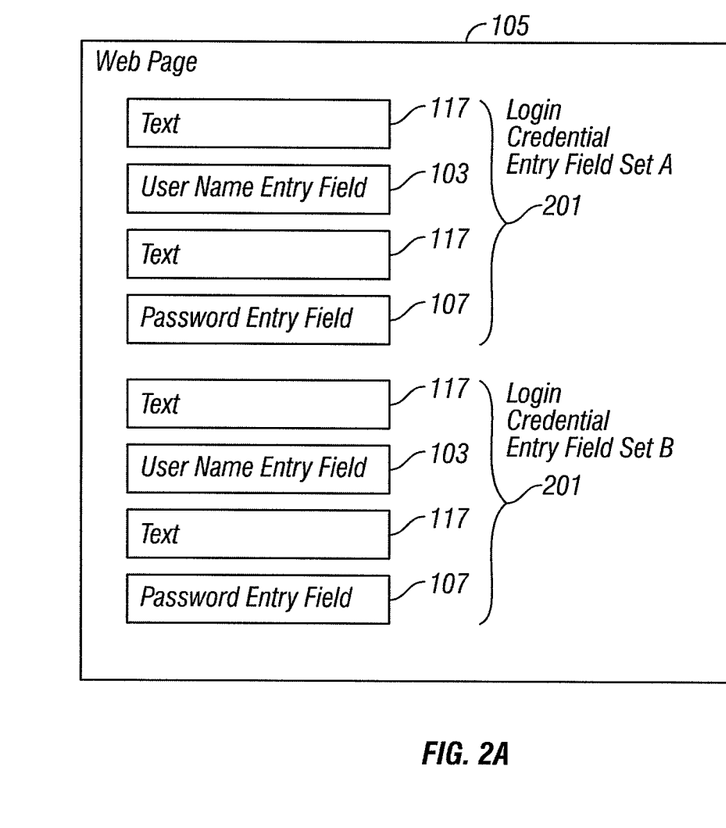
FIG. 2A is a block diagram illustrating a single web page with two sets of login credential entry fields, according to one embodiment of the present invention.

As illustrated in FIG. 2A, in some cases, multiple sets 201 of login credential entry fields appear on a single web page 105. These multiple sets 201 of login credential entry fields can be identified by the login credentials identification component 101, by using the above-described positional analysis. For example, suppose a given web page 105 contains text entry fields 106 prompting a user to login to two different accounts (as illustrated in FIG. 2A). In other words, from that web page 105, a user can login to account A or account B, and the web page 105 contains a separate set 201 of login credential entry fields for each separate account. By using the positional analysis described above (either by itself or supplemented with keyword and/or clarification analysis), the login credentials identification component 101 can identify the two separate user name entry field 103/password entry field 107 pairs, and distinguish between the user name entry field 103 and the password entry field 107 in each such pair.

Figure 2B:
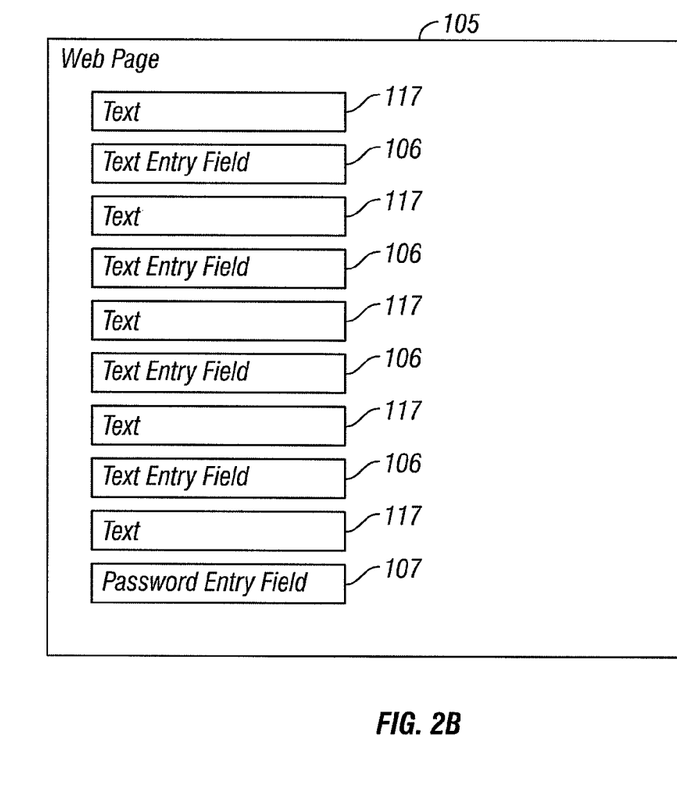
FIG. 2B is a block diagram illustrating a single web page with a large number of text entry fields, according to one embodiment of the present invention.

Turning now to FIG. 2B, sometimes web pages 105 used for registering with a given web based service (i.e., establishing a new electronic bill paying account, establishing a user account with a web based merchant, etc.) have text entry fields 106 and password entry fields 107 similar to those of a login form. Thus, such registration based web pages 105 can be mistaken for web pages 105 containing login forms. In some embodiments of the present invention, the login credentials identification component 101 uses positional analysis (sometimes supplemented by keyword and/or clarification analysis) to make such distinctions. For example, as described above, a web page 105 containing a single password entry field 107 immediately proceeded by a single generic text entry field 106 or by another password entry field 107 indicates a user name entry field 103/password entry field 107 pair, and thus would typically be identified by the login credentials identification component 101 as a login form. On the other hand, a large number of text entry fields 106 and a single password entry field 107 on a single web page 105 (as illustrated in FIG. 2B), especially where accompanied by adjacent text 117 directing a user to enter registration type information such as an address and phone number, is more indicative of a registration site, and could be so identified by the login credentials identification component 101.

Returning to FIG. 1, some web pages 105 contain both a registration form and a login form. That is to say, an individual web page 105 can contain text entry fields 106 prompting a user to register with a service, and then login to a newly created account once the registration is complete. The login credentials identification component 101 can identify such web pages 105 by identifying the registration information entry fields as described above, and identifying a single user name entry field 103/password entry field 107 pair positioned immediately following the registration information entry fields. An example of such a web page 105 is illustrated in FIG. 1 by Web Page n.

Figure 3:
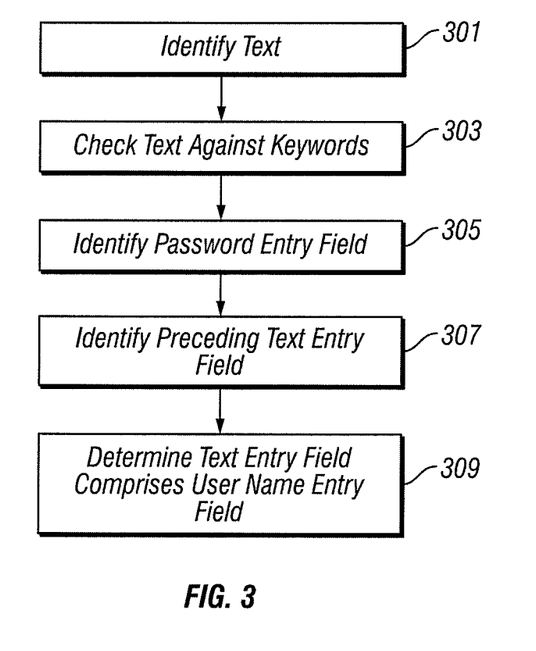
FIG. 3 is a flowchart illustrating steps for using positional analysis to identify login credentials on a web page, according to one embodiment of the present invention.

FIG. 3 is a flowchart illustrating steps for using positional analysis to identify login credentials on a web page 105 (FIG. 1), according to one embodiment of the present invention. As illustrated in FIG. 3, the login credentials identification component 101 (FIG. 1) identifies 301 text 117 (FIG. 1) on a web page 105 (FIG. 1), and checks 303 the identified text 117 (FIG. 1) against known keywords indicative of a user name entry field 103 (FIG. 1). The login credentials identification component 101 (FIG. 1) identifies 305 a password entry field 107 (FIG. 1) on the web page 105 (FIG. 1), by identifying a password entry element 109 (FIG. 1) in the underlying HTML 111 (FIG. 1). The login credentials identification component 101 (FIG. 1) also identifies 307 the text entry field 106 (FIG. 1) immediately, preceding the password entry field 107 (FIG. 1). Based on the position of the text entry field 106 (FIG. 1) relative to the password entry field 107 (FIG. 1), and the supplemental keyword analysis, the login credentials identification component 101 (FIG. 1) determines 309 that the text entry field 106 (FIG. 1) comprises a user name entry field 103 (FIG. 1).

Figure 4:
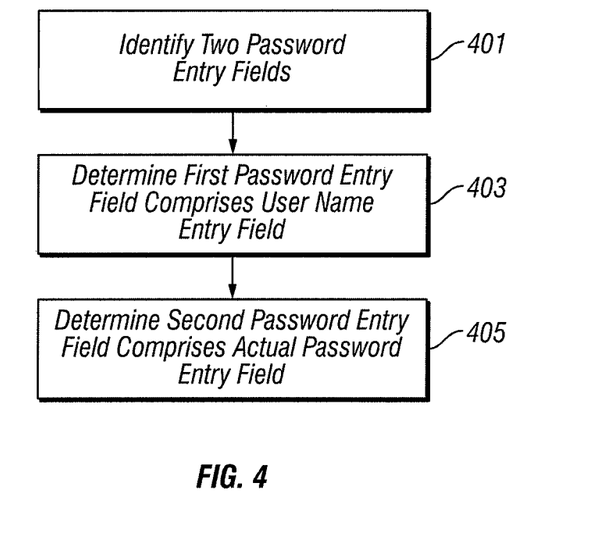
FIG. 4 is a flowchart illustrating steps for using positional analysis to identify login credentials on a web page, according to another embodiment of the present invention.

FIG. 4 is a flowchart illustrating steps for using positional analysis to identify login credentials on a web page 105 (FIG. 1), according to another embodiment of the present invention. As illustrated in FIG. 4, the login credentials identification component 101 (FIG. 1) identifies 401 two password entry fields 107 (FIG. 1) on a single web page 105 (FIG. 1), by identifying the corresponding password entry elements 109 (FIG. 1) in the underlying HTML 111 (FIG. 1). The login credentials identification component 101 (FIG. 1) determines 403 that the password entry field 107 (FIG. 1) immediately preceding the other comprises the user name entry field 103 (FIG. 1). The login credentials identification component 101 (FIG. 1) also determines 405 that the second password entry field 107 (FIG. 1) comprises the actual password entry field 107 (FIG. 1).

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. Additionally, software components of the present invention are in no way limited to implementation in any specific programming language, or for any specific operating system or environment. Furthermore, it will be readily apparent to those of ordinary skill in the relevant art that where components of the present invention are implemented in whole or in part in software, the software components thereof can be stored on computer readable storage media as computer program products. Any form of tangible computer readable storage medium can be used in this context, such as magnetic or optical storage media. As used herein, the term "computer readable storage medium" does not mean an electrical signal separate from an underlying physical medium. Additionally, software components of the present invention can be instantiated (for example as object code or executable images) within the memory of any computing device, such that the software component(s) cause(s) the computing device to perform corresponding functionality. As used herein, the terms "computer" and "computing device" mean one or more computers configured and/or programmed to execute the described functionality. Accordingly, the disclosure of the present invention is intended to be illustrative, but not limiting, of the scope of the invention, which is set forth in the following claims.

What is claimed is:

1. A computer implemented method for using positional analysis to identify login credentials on a web page, the method comprising the steps of:
   identifying a plurality of entry fields on a single web page, by a computer, wherein positions of the plurality of entry fields on the web page are defined by source code;
   identifying, from the source code, at least two of the entry fields of the plurality as a password entry field, by a computer;
   recognizing, from source code, that an entry field immediately preceding a password entry field is another password entry field, by a computer;
   responsive to the positional relationship between the password entry field and the another password entry field immediately preceding the password entry field, inferring that the another password entry field immediately preceding the another password entry field functions as a user name entry field, by a computer.

2. The method of claim 1 further comprising:
   identifying a text field on the web page, said identified text field being adjacent to the identified entry field immediately preceding the password entry field, by a computer;
   performing a keyword analysis of the identified text field, by a computer; and
   responsive to the positional relationship between the identified password entry field and the identified entry field immediately preceding the password entry field, and to results of the keyword analysis, determining that the identified entry field immediately preceding the password entry field comprises a user name entry field, by a computer.

3. The method of claim 1 further comprising:
   identifying at least one text field on the web page, by a computer;
   performing a clarification analysis of at least one identified text field, by a computer; and
   responsive to the positional relationship between the identified password entry field and the identified entry field immediately preceding the password entry field, and to results of the clarification analysis, determining that the identified entry field immediately preceding the password entry field comprises a user name entry field, by a computer.

4. The method of claim 1 further comprising:
   performing a clarification analysis of at least one of the plurality of identified entry fields, by a computer; and
   responsive to the positional relationship between the identified password entry field and the identified entry field immediately preceding the password entry field, and to results of the clarification analysis, determining that the identified entry field immediately preceding the password entry field comprises a user name entry field, by a computer.

5. The method of claim 1 further comprising:
   identifying at least two password entry fields on the web page, by a computer;
   for each of the at least two identified password entry fields, identifying a separate text entry field immediately preceding that password entry field, by a computer;
   determining that each of the at least two identified password entry fields combined with the immediately preceding separate text entry field comprises a set of login credential entry fields, by a computer; and
   responsive to 1) the positional relationship between the at least two password entry fields and the immediately preceding separate text entry fields, and to 2) determining that each of the at least two password entry fields combined with the immediately preceding separate text entry field comprises a set of login credential entry fields:
      determining, for each said set of login credential entry fields, that the separate text entry field immediately preceding the identified password entry field comprises a user name entry field, by a computer.

6. The method of claim 1 further comprising:
identifying at least one text field on the web page, by a computer;
performing a keyword analysis of at least one identified text field, by a computer; and
responsive to at least results of the keyword analysis, determining that the web page comprises a registration form, by a computer.

7. The method of claim 1 further comprising:
identifying at least one text field on the web page, by a computer;
performing a keyword analysis of at least one identified text field, by a computer;
responsive to at least results of the keyword analysis, determining that the web page contains a registration form, by a computer and
responsive to the positional relationship between the identified password entry field and the identified entry field immediately preceding the password entry field, and to results of the keyword analysis, determining that the identified entry field immediately preceding the password entry field comprises a user name entry field, and that the web page also contains a login form, by a computer.

8. At least one non-transitory computer readable storage medium storing a computer program product for using positional analysis to identify login credentials on a web page, the computer program product comprising:
program code for identifying a plurality of entry fields on a single web page, by a computer, wherein positions of the plurality of entry fields on the web page are defined by source code;
program code for identifying, from the source code, at least two of the entry fields of the plurality as a password entry field;
program code for recognizing, from source code, that an entry field immediately preceding a password entry field is another password entry field, by a computer;
program code for, responsive to the positional relationship between the password entry field and the another password entry field immediately preceding the password entry field, inferring that the another password entry field immediately preceding the another password entry field functions as a user name entry field, by a computer.

9. The computer program product of claim 8 further comprising:
program code for identifying a text field on the web page, said identified text field being adjacent to the identified entry field immediately preceding the password entry field, by a computer;
program code for performing a keyword analysis of the identified text field, by a computer; and
program code for, responsive to the positional relationship between the identified password entry field and the identified entry field immediately preceding the password entry field, and to results of the keyword analysis, determining that the identified entry field immediately preceding the password entry field comprises a user name entry field, by a computer.

10. The computer program product of claim 8 further comprising:
program code for identifying at least one text field on the web page, by a computer;
program code for performing a clarification analysis of at least one identified text field, by a computer; and
program code for, responsive to the positional relationship between the identified password entry field and the identified entry field immediately preceding the password entry field, and to results of the clarification analysis, determining that the identified entry field immediately preceding the password entry field comprises a user name entry field, by a computer.

11. The computer program product of claim 8 further comprising:
program code for performing a clarification analysis of at least one of the plurality of identified entry fields, by a computer; and
program code for, responsive to the positional relationship between the identified password entry field and the identified entry field immediately preceding the password entry field, and to results of the clarification analysis, determining that the identified entry field immediately preceding the password entry field comprises a user name entry field, by a computer.

12. The computer program product of claim 8 further comprising:
program code for identifying at least two password entry fields on the web page, by a computer;
program code for, for each of the at least two identified password entry fields, identifying a separate text entry field immediately preceding that password entry field, by a computer;
program code for determining that each of the at least two identified password entry fields combined with the immediately preceding separate text entry field comprises a set of login credential entry fields; and
program code for, responsive to 1) the positional relationship between the at least two password entry fields and the immediately preceding separate text entry fields, and to 2) determining that each of the at least two password entry fields combined with the immediately preceding separate text entry field comprises a set of login credential entry fields:
determining, for each said set of login credential entry fields, that the separate text entry field immediately preceding the identified password entry field comprises a user name entry field, by a computer.

13. The computer program product of claim 8 further comprising:
program code for identifying at least one text field on the web page, by a computer;
program code for performing a keyword analysis of at least one identified text field, by a computer; and
program code for, responsive to at least results of the keyword analysis, determining that the web page comprises a registration form, by a computer.

14. The computer program product of claim 8 further comprising:
program code for identifying at least one text field on the web page, by a computer;
program code for performing a keyword analysis of at least one identified text field, by a computer;
program code for, responsive to at least results of the keyword analysis, determining that the web page contains a registration form, by a computer and
program code for, responsive to the positional relationship between the identified password entry field and the identified entry field immediately preceding the password entry field, and to results of the keyword analysis, determining that the identified entry field immediately preceding the password entry field comprises a user name entry field, and that the web page also contains a login form, by a computer.

15. A computer system for using positional analysis to identify login credentials on a web page, the computer system comprising:
- a processor; and
- a memory, storing:
    - an identification module to identify a plurality of entry fields on a single web page, wherein positions of the plurality of entry fields on the web page are defined by source code, wherein the identification module identifies, from the source code, at least two of the entry fields of the plurality as a password entry field;
    - a recognition module to recognize, from source code, that an entry field immediately preceding a password entry field is another password entry field;
    - an inferring module, responsive to the positional relationship between the password entry field and the another password entry field immediately preceding the password entry field,
    - to infer that the another password entry field immediately preceding the another password entry field functions as a user name entry field.

16. The computer system of claim 15 further comprising:
the identification module to identify a text field on the web page, said identified text field being adjacent to the identified entry field immediately preceding the password entry field;
an analysis module to perform a keyword analysis of the identified text field; and
the inference module, responsive to the positional relationship between the identified password entry field and the identified entry field immediately preceding the password entry field, and to results of the keyword analysis, to infer that the identified entry field immediately preceding the password entry field comprises a user name entry field.

17. The computer system of claim 15 further comprising:
the identification module to identify at least two password entry fields on the web page, the identification module, for each of the at least two identified password entry fields, to identify a separate text entry field immediately preceding that password entry field, the identification module to identify that each of the at least two identified password entry fields combined with the immediately preceding separate text entry field comprises a set of login credential entry fields; and
responsive to 1) the positional relationship between the at least two password entry fields and the immediately preceding separate text entry fields, and to 2) determining that each of the at least two password entry fields combined with the immediately preceding separate text entry field comprises a set of login credential entry fields:
    for determining, for each said set of login credential entry fields, that the separate text entry field immediately preceding the identified password entry field comprises a user name entry field.

* * * * *